United States Patent [19]

Shono et al.

[11] 4,159,200
[45] Jun. 26, 1979

[54] AIR NOZZLE ASSEMBLY FOR USE IN APPARATUS FOR PRODUCING GLASS FIBERS

[75] Inventors: Hiroaki Shono; Shinzo Ishikawa; Isao Wakasa, all of Fukushima, Japan

[73] Assignee: Nitto Boseki Co., Ltd., Fukushima, Japan

[21] Appl. No.: 841,745

[22] Filed: Oct. 13, 1977

[30] Foreign Application Priority Data

Mar. 11, 1977 [JP] Japan .................................. 52-26935

[51] Int. Cl.² ............................................. C03B 37/02
[52] U.S. Cl. ............................................. 65/12; 65/2; 65/16; 264/179; 425/72 R
[58] Field of Search .......................... 65/2, 5, 12, 16; 264/169; 425/72 R

[56] References Cited
U.S. PATENT DOCUMENTS

| 3,986,853 | 10/1976 | Coggin et al. | 65/12 X |
| 4,003,731 | 1/1977 | Thompson | 65/12 |
| 4,033,742 | 7/1977 | Nichols et al. | 65/2 |

Primary Examiner—Robert L. Lindsay, Jr.
Attorney, Agent, or Firm—Jay L. Chaskin

[57] ABSTRACT

In an apparatus for producing glass fibers wherein an orifice plate formed with a greater number of orifice holes in high density is provided to draw glass fibers therethrough and air nozzle means is provided for impinging air flow against the undersurface of the orifice plate so that the adjacent cones of molten glass formed on the undersurface of the orifice plate may be prevented from coalescing to each other, an air nozzle assembly is provided which includes a plurality of tubular nozzles arranged in such a way that their discharge ports may be arranged in line and in parallel with the longitudinal direction of the array of orifice holes in the orifice plate and spaced apart from each other by a predetermined distance. High cooling efficiency may be attained with a less consumption of cooling air; the undersurface of the orifice plate may be uniformly cooled; the operation for separating a bead of molten glass formed on the undersurface of the orifice plate into individual cones may be facilitated; and the filament or fiber breakage due to the impingement of the air jets may be avoided.

13 Claims, 7 Drawing Figures

AIR NOZZLE ASSEMBLY FOR USE IN APPARATUS FOR PRODUCING GLASS FIBERS

The present invention relates to an air nozzle assembly for impinging air jets against the undersurface of an orifice plate used in an apparatus for forming glass fibers.

U.S. Pat. No. 3,905,790 discloses a method and apparatus for forming glass fibers employing a generally flat orifice plate with orifices being closely spaced in flooding relationship, wherein a bulk flow of gas is directed upwardly to the orifice plate to cool molten glass cones formed at each orifice to provide a stable cone formation and to maintain separation of cones thus preventing flooding, to impinge on the orifice plate to eliminate stagnant gas adjacent to the plate, and to supply a source of gas sucked downwardly by the fibers.

U.S. Pat. No. 3,986,853 discloses an air nozzle effective to direct an air flow toward the orifice plate in the apparatus for forming glass fibers as described above. As will be described in detail with reference to FIG. 1, the air nozzle includes a plurality of air inlet pipes and a common discharge port so that the air forced through the air inlet pipes under a same pressure issue from the single discharge port as a bulk flow.

In general, the cooling effect on the orifice plate is measured in terms of the force imparted by the air flow impinging against the orifice plate. This force in turn is in proportion to the quantity and velocity of air flow. That is, $$F = K \cdot Q \cdot U \tag{1}$$

where F = force imparted to the orifice plate by the air flow;
K = a coefficient;
Q = a quantity of the air flow; and
U = a velocity of the air flow.

If the quantity of an air flow is maintained constant, the air flows through a nozzle having a smaller diameter at a faster speed than through a nozzle having a larger diameter. That is, the air flow issuing from a nozzle having a smaller diameter exerts a greater force to an orifice plate than the air flow issuing from a nozzle having a larger diameter. Furthermore the air flow or jet issuing from the nozzle diverges, and the pressure of the air flow decreases with the distance away from the axis of the nozzle. As a result the pressure of the air which impinges against the orifice also decreases with the distance away from the intersection between the axis of the nozzle and the orifice plate. In general orifice plates are made of a metal having a high thermal conductivity such as platinum so that the orifice plate has a tendency to be quickly cooled by air to a uniform temperature within a predetermined area. For instance when the distance between the orifice plate and an air nozzle is 100 to 180 mm which is the most preferable distance in practice, the area equal to 9 to 16 times the diameter of the air nozzle on the orifice plate may be uniformly cooled. That is, the uniformly cooled area on the orifice plate is in proportion to the cross sectional area of the air nozzle so that the greater the diameter of the air nozzle, the greater the uniformly cooled area on the orifice plate becomes. The pressure P exerted from the air which impinges against the orifice plate is given by $$P = F/A \tag{2}$$

where A = area of the uniformly cooled area on the orifice plate. Thus an air nozzle with a larger diameter will attain less cooling effect, but when the diameter of the air nozzle is too small, the effectively, uniformly cooled area decreases so that the area of an array of orifices formed in the orifice plate is limited. Therefore the air nozzle of the type disclosed in said U.S. Pat. No. 3,985,853 have the following problems:

(1) Since a plurality of air flows supplied through a plurality of inlet pipes are joined together and a single air flow continuously issues from the single port, satisfactory cooling effect cannot be attained as with the case of an air nozzle having a larger diameter.

(2) If the flow quantity of cooling air is increased in order to attain high cooling effect, turbulence are produced so that the orifices in the orifice plate cannot be cooled uniformly; that is, the temperature distribution in the orifice plate is not uniform. In addition the filaments drawn through the orifices in the orifice plate are bowed or deflected. As a result filament breakage tends to occur very often. Thus with the air nozzle of the type described, stable spinning of glass fibers cannot be ensured.

One of the objects of the present invention is therefore to provide an air nozzle assembly for use in a method and apparatus for forming glass fibers which may attain excellent cooling effect with a minimum consumption of cooling air so that stable glass fiber spinning may be ensured.

Another object of the present invention is to provide an air nozzle assembly having a plurality of tubular nozzles arranged in such a way that their air discharge ports may be arranged in line and spaced apart from each other by a predetermined distance.

The above and other objects, features and advantages of the present invention will become apparent from the following description of preferred embodiments thereof taken in conjunction with the accompanying drawings.

Prior to the description of the preferred embodiments of the present invention, the prior art air nozzle of the type disclosed in U.S. Pat. No. 3,986,853 will be described briefly with reference to FIG. 1 in order to specifically point out the problems thereof which the present invention may overcome as will be described below. Individual air flows under a same pressure are supplied through a plurality of air inlet pipes 1 arranged in parallel and are guided by guides 2 to diverge and then be diffused into a substantial single air flow, issuing from an opening 3. The air issuing from the opening 3 impinges against the whole undersurface of an orifice plate under a nearly uniform pressure so that the orifice plate may be uniformly cooled. However, the air nozzle is in fact equivalent to a single nozzle having only one hole of a relatively larger diameter so that the cooling capacity is low as described previously. If the flow quantity is increased in order to increase the cooling capacity, the turbulence are produced in the vicinity of the orifice plate so that uniform cooling cannot be attained. Furthermore, the increased air jet blows away and deflects the glass filaments being drawn, consequently causing filament breakage.

Figure 2:
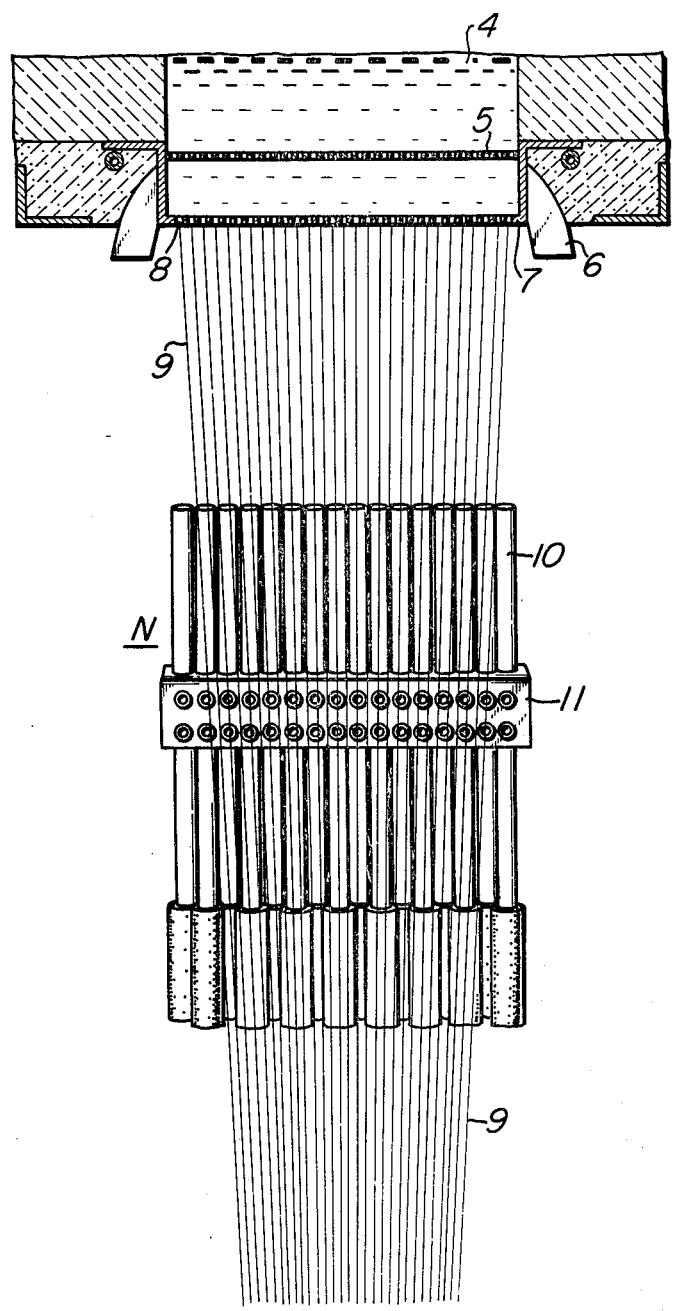
FIGS. 2 and 3 are front and side sectional views, respectively, of an apparatus for forming glass fibers incorporating an air nozzle assembly in accordance with the present invention.
Figure 3:
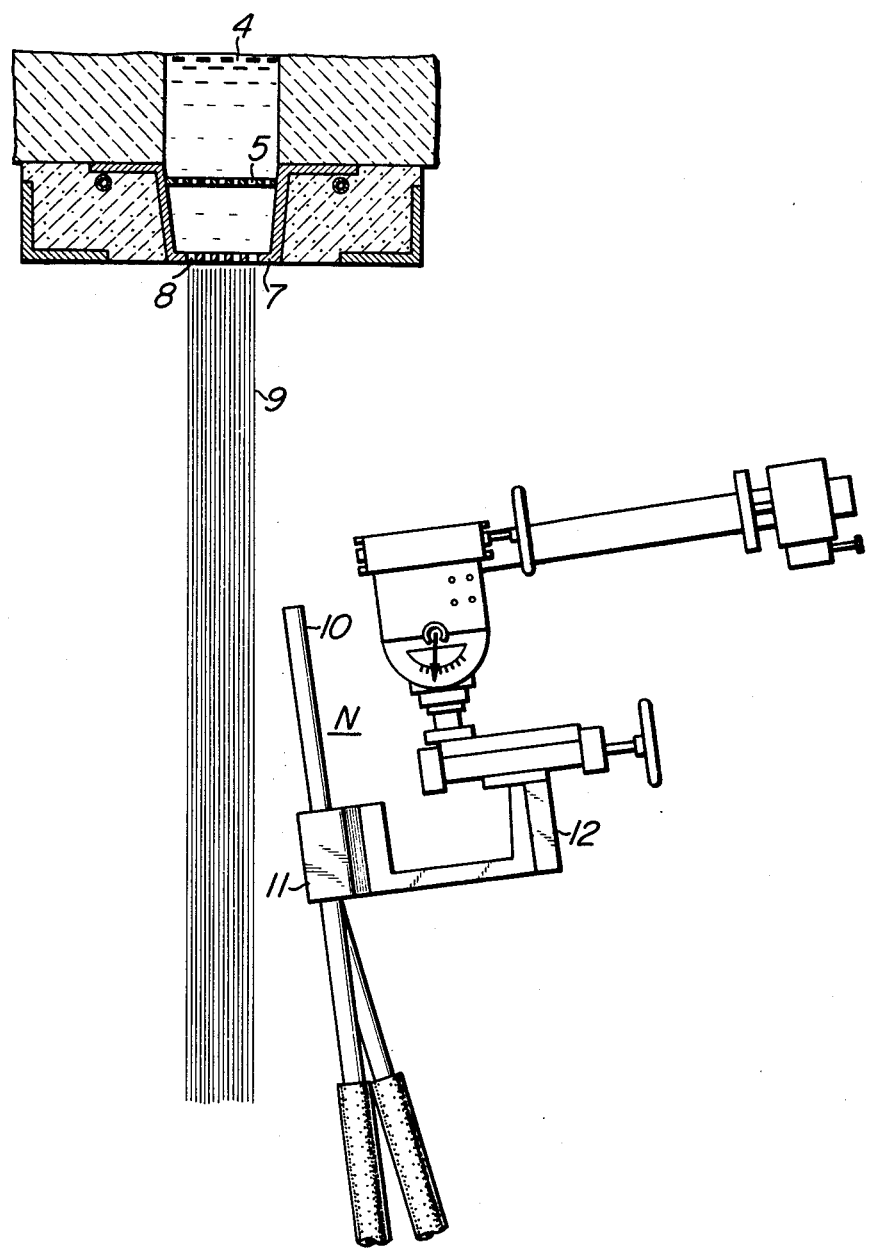

In FIGS. 2 and 3 there is shown an apparatus for producing glass fibers incorporating therein an air nozzle assembly in accordance with the present invention. Molten glass 4 which is supplied from a forehearth flows down through a bushing screen 5 into a bushing. Electric current flows through terminals 6 so that the bushing may be maintained at a suitable temperature. The molten glass in the bushing flows through a great number of orifices 8 of an orifice plate 7 into the atmosphere to form individual filaments 9 which are mechanically drawn downward. Concurrently, the air jets issuing from an air nozzle assembly impinge against the undersurface of the orifice plate 7 so that the adjacent cones of molten glass formed on the undersurface of the orifice plate 7 may be prevented from coalesing from each other.

The air nozzle assembly N in accordance with the present invention includes a plurality of tubular nozzles 10 which are preferably mounted on a support 11 in one row and in parallel with each other. The support 11 in turn is held in optimum position by a positioning stand 12.

Figure 4:
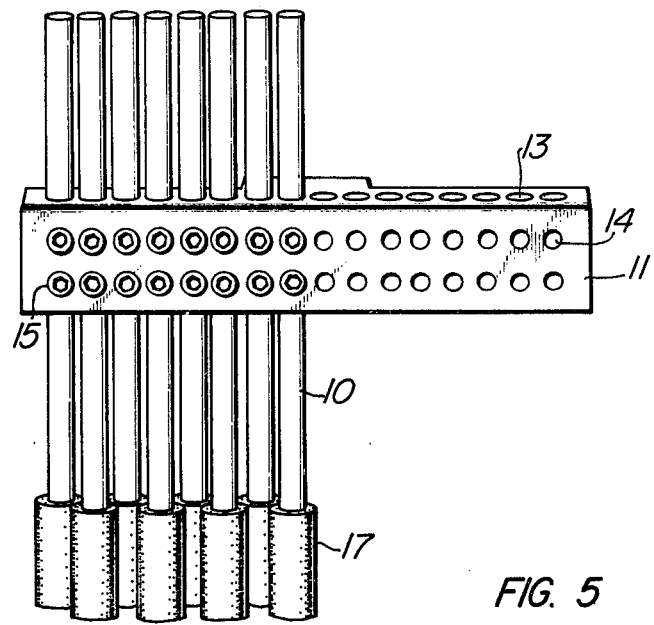
FIGS. 4 and 5 are front and rear views, respectively, used for the explanation of the method for mounting tubular air nozzles on a support.
Figure 5:
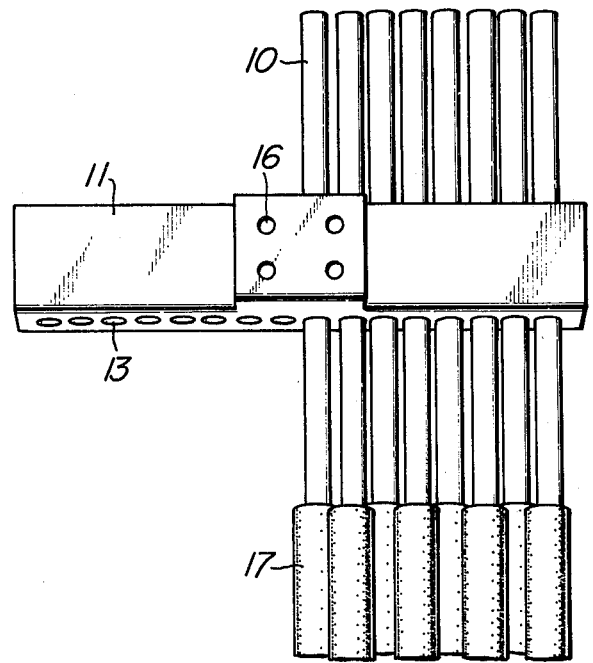

FIGS. 4 and 5 are the front and rear views, respectively, of the air nozzle assembly N in accordance with the present invention including a plurality of tubular nozzles 10 mounted on the support 11. The support 11 is formed with a plurality of insertion holes 13 having a diameter slightly greater than the outer diameter of the tubular nozzles 10, and the tubular nozzles 10 are inserted into and extended through these tubular nozzle receiving holes 13 and are securely held in position with setscrews 15 or the like screwed into tapped holes 14 drilled into the support 11. A raised portion centrally located on the rear surface of the support 11 between its ends are formed with a plurality of tapped holes 16 which are used for mounting the air nozzle assembly N on the positioning stand 12 which permits the air nozzle assembly N to move up and down, back and forth and to right and left and to rotate so that the air nozzle assembly N may be held in optimum position relative to the orifice plate 7. The lower ends of the tubular nozzles 10 are connected to hoses 17 which in turn are communicated with an air source not shown. Air jets issuing from the tubular nozzles 10 flow upward to cool the filaments being drawn and the cones of molten glass at the undersurface of the orifice plate 7 and impinge against the undersurface of the orifice plate 7 to cool it.

Figure 6:
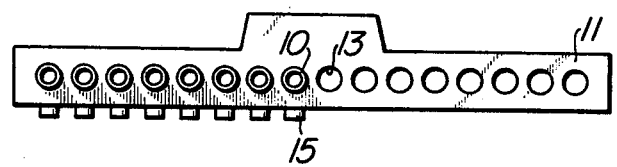
FIG. 6 is a top view of an air nozzle assembly according to the present invention having a plurality of tubular nozzles circular in cross section.

In general the orifice plate 7 is rectangular in shape and is formed with more than 800 orifices so that the discharge ports of the tubular nozzles 10 are arranged in parallel with one of the longer sides of the orifice plate 7 and are spaced apart from each other by a suitable distance. As best shown in FIG. 6, the tubular nozzles 10 are in general circular in cross section and are preferably made of a metal such as copper, aluminum, brass, steel or stainless steel, though not limited thereto. The optimum cooling effect can be obtained when the cross sectional area of the tubular nozzles 10 is between 40 and 100 mm$^2$. When the cross sectional area is too small, some local areas of the orifice plate 7 is cooled excessively with a resultant non-uniform temperature distribution in the orifice plate 7. On the other hand when the cross sectional area is too great, satisfactory cooling effect cannot be attained, and the flow quantity of air must be increased in order to compensate the unsatisfactory cooling effect. However when the flow quantity of the air jets is increased excessively, the filaments being drawn are blown away and deflected and the adjacent cones of molten glass on the undersurface of the orifice plate 7 are caused to join with each other so that the filament breakage results. It is preferable that the distance between the axes of the adjacent tubular nozzles 10 be as shorter as practicable, but the shorter the distance between the axes of the adjacent tubular nozzles 10, the greater the number of tubular nozzles 10 mounted on the support 11 becomes and consequently the greater the flow quantity of air becomes.

The air nozzle assembly N with the above construction may attain various advantages as described below.

(1) As compared with the prior art air nozzles, it may permit an operator in a shorter time and in a simpler manner to separate the individual glass filaments from the coalesced cones of molten glass formed on the undersurface of the orifice plate 7.

(2) As compared with the prior art air nozzles, higher cooling efficiency may be attained with a smaller flow quantity of air.

(3) The orifice plate may be uniformly cooled.

(4) The bowing or deflection of glass filaments which results in filament breakage may be substantially eliminated.

(5) The air nozzle assembly is simple in construction so that it may be fabricated in a simpler manner at less cost.

In addition, when the discharge end portions of the tubular nozzles 10 are extended from the support 11 so as to provide a space between each pair of adjacent tubular nozzles 10, as shown in drawings, the air between the adjacent tubular nozzles 10 is entrained by the air jets issuing from the nozzles 10 and consequently the volume of the air impinging against the undersurface of the orifice plate 7 is greater than the volume of air actually supplied through the hoses 17. In general, the smaller the diameter of the tubular nozzles 10, the more the air is entrained by the air jets issuing from the nozzles 10.

Furthermore as shown in FIG. 3 the tubular nozzles 10 are inclined at an angle relative to the orifice plate 7 so that the width of the area of the orifice plate 7 against which air jets impinge is increased. As a result, the width of the area of the orifice plate 7 which is uniformly cooled is three to four times the diameter of the discharge port of the tubular nozzles 10 (it is almost equivalent to the area of 9 to 16 times the diameter of the discharge port), the area being also dependent upon the density of the tubular nozzles 10, the volume of air entrained by the air jets issuing therefrom, the thermal conductivity of the orifice plate and so on. Since the effective area of the undersurface of the orifice plate which is cooled by the air jets is greater than the total cross sectional area of the individual tubular nozzles 10 as described above, the distance between the centers of the adjacent tubular nozzles 10 which are arranged in parallel with the longer sides of the orifice plate 7 may be increased and consequently the tubular nozzles 10 may be decreased in number. As a result, the volume of air supply or the consumption of air may be decreased.

Next some examples of the present invention will be described.

EXAMPLE 1

Figure 1:
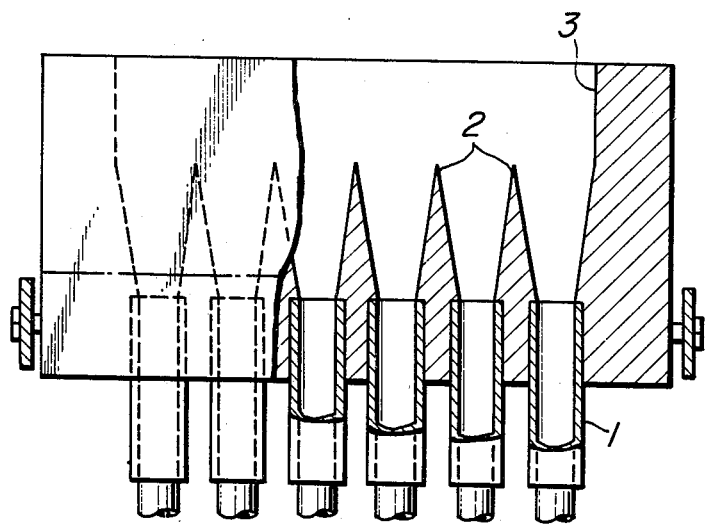
FIG. 1 is a front view, partly in section, of a prior art air nozzle.

For the sake of comparison the prior art nozzle of the type shown in FIG. 1 and with a discharge opening of following dimensions was used.
- length: 198 mm
- width: 7 mm
- cross sectional area: 1 386 m$^2$
- number of inlet pipes: 10

The dimensions of the air nozzle assembly in accordance with the present invention are:
- inner diameter: 8.4 mm
- cross sectional area: 55 mm$^2$
- number of nozzles: 16
- total cross sectional area: 887 mm$^2$
- pitch: 12 mm These air nozzles were used in conjunction with the orifice plate with the following dimensional data:
- width of an array of orifice holes: 32.4 mm
- length of the array of orifice holes: 200.7 mm
- number of orifice holes: 2000
- throughput: 800 grams/min.

The results are:

|  | Prior Art | The invention |
|---|---|---|
| separation time | 35 min. | 8 min. |
| temperature distribution on an orifice plate | ± 50° C. | ± 3° C. |
| flow quantity of air required for lowering the orifice plate by 100° C. | 3.0 m$^3$/min. | 1.5 m$^3$/min. |
| deflection of filaments | yes | negligible |

EXAMPLE 2

Three orifice plates A, B and C with the following dimensions were prepared:

|  | A | B | C |
|---|---|---|---|
| number of orifice holes | 800 | 2000 | 4000 |
| width of orifice hole array in mm | 24 | 32 | 38 |
| length of orifice hole array in mm | 73 | 200 | 340 |
| throughput gram/min. | 300 | 850 | 1500 |

Three air nozzle assemblies A', B' and C' were prepared according to the invention for respective orifice plates A, B and C.

|  | A' | B' | C' |
|---|---|---|---|
| inner diameter of air nozzle in mm | 7 | 9 | 11 |
| total cross sectional area in mm$^2$ | 269 | 1018 | 2376 |
| number of nozzles | 7 | 16 | 25 |
| pitch in mm | 9 | 11.5 | 13 |
| flow quantity of air in liter/min. | 580 | 1750 | 3200 |

The air nozzle assemblies cooled the orifice plates satisfactorily and uniformly so that the continuous glass fiber drawing operation was possible.

Figure 7:
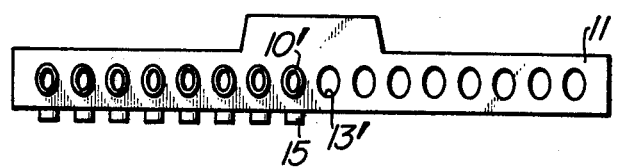
FIG. 7 is a top view of an air nozzle assembly according to the present invention having a plurality of tubular nozzles elliptical in cross section.

With the tubular nozzles circular in cross section, the orifice plate may be satisfactorily cooled in the longitudinal direction thereof. However the uniform cooling of the orifice plate in the lateral direction thereof may be attained only when the diameter of the tubular nozzles is greater than one quarter of the width of the orifice hole array in the orifice plate. That is, when the diameter of nozzles is less than a quarter of the width of the orifice hole array, the orifices outside of the areas against which impinge the air jets are not effectively cooled so that the cones of molten glass at these orifices tend to coalesce to each other. In order to overcome this problem, the present invention further provides tubular nozzles elliptical in cross section. In this specification the term "elliptical in cross section" refers to any cross section similar to an ellipse having a major axis and a minor axis and being symmetrical about these major and minor axes. Therefore an elliptical cross section includes an oval cross section and a section consisting of two parallel sides equal in length and convex semicircular or elliptical curves connecting the ends of these sides. The minor axes of the tubular nozzles 10' elliptical in cross section are arranged in parallel with the longitudinal direction of the orifice plate as shown in FIG. 7. Thus the orifice plate may be uniformly cooled in the latral direction thereof.

The tubular nozzles elliptical in cross section may be fabricated by pressing tubular nozzles circular in cross section to flatten them or heating them over a die or directly passing blanks through a die adapted to form a tubular nozzle elliptical in cross section. The tubular nozzles rectangular in cross section may be also used in the present invention, but the fabrication thereof is rather expensive.

The tubular nozzles may be elliptical cross section throughout their length. Alternatively, they may be elliptical in cross section over a predetermined length from their discharge ports with the remaining length being circular in cross section. It is preferable that the distance between the centers of the adjacent tubular nozzles elliptical in cross section be less than three times the length of the minor axis.

With the tubular nozzles elliptical in cross section, the width of the array of orifices in the orifice plate may be increased to 60 mm from 40 mm available with the prior art orifice plates cooled by the prior art air nozzles. The number of orifices in one orifice plate therefore may be increased by 1.5 times as compared with the prior art. Furthermore the width of the orifice plate may be increased while the length thereof may be decreased as compared with the prior art orifice plates so that the volume or capacity of the spinning furnace may be decreased. The width or length in the lateral direction of the area of the orifice plate which is cooled by the air jets issuing from these tubular nozzles elliptical in cross section is three to four times the length of the major axis. Thus the width of the area that may be effectively cooled by the air jets may be considerably increased. Furthermore even though the tubular nozzle circular in cross section is flattened to have the elliptical cross section, the cross sectional area of the tubular nozzle elliptical in cross section is substantially equal to the cross sectional area of the tubular nozzle circular in cross section so that the air consumption remains almost same. Furthermore the velocity of air jets is faster compared with the prior art so that the force exerted to the orifice plate by the air jet is increased accordingly and consequently more effective cooling may be attained. The advantages of the tubular nozzles elliptical in cross section may be summarized as follows:

(1) The orifice in the lateral direction of the orifice plate may be increased in number:

(2) The cooling area in the lateral direction on the orifice plate may be increased without increasing the cross sectional area of the tubular nozzles elliptical in cross section and thus without decreasing the velocity of air jets. That is, the air jets impart higher forces to the orifice plate with a small volume of air so that high cooling efficiency may be attained.

(3) The filaments are not subjected to bowing or deflection.

Next some examples of the tubular nozzles elliptical in cross section may be described.

EXAMPLE 3

The orifice plate having the following dimensions was prepared.
number of orifice holes: 4050
width of array of orifice holes: 46.0 mm
length of array of orifice holes: 344.0 mm
throughput: 1600 gram/min.

When the air nozzle assembly having a plurality of tubular nozzles circular in cross section was used, the cooling of the orifice plate was unsatisfactory especially in the vicinity of longitudinal edges thereof. To overcome this problem the air nozzle assembly having the tubular nozzles elliptical in cross section with the following dimensions was prepared:
cross section: ellipse
major axis: 13 mm
minor axis: 5 mm
number of nozzles: 30
pitch: 11 mm
total air flow rate: 3.2 m³/min.

The stable glass fiber spinning was possible.

EXAMPLE 4

The air nozzle assembly with the following dimensions was prepared:
cross section: circular
inner diameter: 8.5 mm
number of nozzles: 20
total flow rate: 1.7 m³/min.

With this air nozzle assembly, the largest orifice plate which could be satisfactorily cooled was as follows:
number of orifice holes: 2008
width of array of orifice holes: 32.0 mm
length of array of orifice holes: 252.0 mm
throughput: 850 gram/min.

The air nozzle assembly with the following dimensions was also prepared:
cross section of nozzles: elliptical
major axis: 11.0 mm
minor axis: 5.5 mm
number of nozzles: 20
total flow rate: 1.7 m³/min.

With this air nozzle assembly, the largest orifice plate which could be satisfactorily cooled had the following dimensions:
number of orifice holes: 2008
width of array of holes: 38.0 mm
length of array of holes: 207.9 mm
drawing speed: 850 gram/min.

As a result the length of the bushing may be reduced by about 20 mm.

Various modifications in structure and/or function may be made by one skilled in the art to the disclosed embodiments without departing from the scope of the invention as defined by the claims.

What is claimed is:

1. An air nozzle assembly for cooling a glass fiber drawing bushing assembly including an orifice plate having a flat undersurface and a plurality of closely-spaced orifices disposed in an elongated array during start up, flood clearing and drawing, said nozzle assembly comprising a support, a plurality of tubular nozzles mounted on said support so that their discharge ports are spaced apart from one another and arranged in a single row, means for supplying air to said nozzles and means for positioning said nozzles beneath said bushing assembly so that said row extends in the longitudinal direction of said array but is offset from the longitudinal centerline of said array and said nozzles are aimed directly at said undersurface to discharge individual streams of air which directly impinge upon associated local areas of said undersurface, said local areas being substantially along the longitudinal centerline of said array wherein the cross-sectional configuration of each of the discharge ports of the plurality of nozzles is elliptical, the ellipses having minor axes arranged in line and in parallel with the longitudinal direction of the array of orifices, each ellipses having at least a 2.0 ratio of major axis to minor axis for each nozzle.

2. An air nozzle assembly as set forth in claim 1 wherein said plurality of tubular nozzles are mounted on a support in such said way that their leading portions may be extended beyond said support.

3. An air nozzle assembly as set forth in claim 1 wherein the cross sectional area of said discharge port is 40 to 100 mm².

4. An air nozzle assembly as set forth in claim 1. wherein the major axis of said discharge port is greater than a quarter of width of an array of orifice holes formed in said orifice plate.

5. An air nozzle assembly as set forth in claim 1 wherein the distance between the centers of the adjacent discharge ports is less than three times the minor axis thereof.

6. In a glass fiber drawing apparatus of the type having an orifice plate with plurality of closely spaced orifices disposed in an elongated array and a flat undersurface, the improvement comprising means for cooling said orifice plate during startup, flood clearing and drawing, said means for cooling comprising a support, a plurality of tubular nozzles mounted to said support so that their discharge ports are remote from one another and lie in one row, air supply means in communication with said nozzles, and means for positioning said nozzles beneath said orifice plate so that said row of discharge ports extends in the longitudinal direction of said array, the discharge ports of said nozzles are offset from the longitudinal centerline of said array, and each of said nozzles is aimed directly at an associated local area of said undersurface lying substantially on the longitudinal centerline of said array, whereby each of said nozzles will discharge an individual jet of air directly against its associated local area of said undersurface wherein the discharge port of each of said nozzles is elliptical, the ellipses having minor axes extending in the direction of said row of nozzles, each ellipse having at least a 2.0 ratio of major axis to minor axis for each nozzle.

7. The improvement as claimed in claim 6, wherein said means for cooling does not include means for directing a bulk flow of air against said orifice plate.

8. The improvement as claimed in claim 6, wherein each of said tubular nozzles is mounted on said support so that its leading end extends beyond said support.

9. The improvement as claimed in claim 6 wherein the ratio of major axis to minor axis is 2.6.

10. An air nozzle assembly as claimed in claim 6 wherein the cross sectional area of said discharge port is 40 to 100 mm$^2$.

11. The improvement as claimed in claim 6, wherein the length of the major axis of the discharge port of each of said nozzles is greater than a quarter of the width of said array of orifices.

12. The improvement as claimed in claim 6, wherein the distance between the centers of adjacent ones of said discharge ports is less than three times the length of the minor axis of each of said discharge ports.

13. An air nozzle assembly as claimed in claim 1 wherein the ratio of major axis to minor axis is 2.6.

* * * * *

UNITED STATES PATENT AND TRADEMARK OFFICE
CERTIFICATE OF CORRECTION

PATENT NO. : 4,159,200
DATED : June 26, 1979
INVENTOR(S) : Hiroaki Shono et al.

It is certified that error appears in the above-identified patent and that said Letters Patent are hereby corrected as shown below:

Column 8, line 34, for "on a support in such said way" read --on said support in such a way--.

Signed and Sealed this

Twelfth Day of February 1980

[SEAL]

Attest:

SIDNEY A. DIAMOND

Attesting Officer

Commissioner of Patents and Trademarks